United States Patent [19]

Kamigaito et al.

[11] Patent Number: 4,645,115

[45] Date of Patent: Feb. 24, 1987

[54] METHOD OF BONDING CERAMIC ARTICLE

[75] Inventors: Osami Kamigaito; Haruo Doi; Shoji Noda; Nobuyuki Yamamoto, all of Aichi, Japan

[73] Assignee: Kabushiki Kaisha Toyota Chuo Kenkyusho, Aichi, Japan

[21] Appl. No.: 726,973

[22] Filed: Apr. 25, 1985

[30] Foreign Application Priority Data

May 1, 1984 [JP] Japan ................... 59-88913

[51] Int. Cl.$^4$ ............ B23K 31/02; B05D 3/06; C23C 14/00
[52] U.S. Cl. ...................... 228/121; 228/122; 228/124; 228/263.12; 204/192.31; 250/492.3; 427/38
[58] Field of Search ............ 228/263.12, 121, 122, 228/123, 124, 205; 204/192 E, 192 N; 250/492.21, 492.3; 427/35, 38

[56] References Cited

U.S. PATENT DOCUMENTS

| 2,428,868 | 10/1947 | Dimmick | 427/35 |
| 3,078,564 | 2/1963 | Bourdeau | 228/263.12 |
| 3,339,267 | 9/1967 | Bronnes et al. | 228/124 |
| 3,351,543 | 11/1967 | Vanderslice | 228/121 |
| 3,682,729 | 8/1972 | Guckelberger | 156/643 |
| 4,011,982 | 3/1977 | Marancik | 228/205 |
| 4,232,094 | 11/1980 | Rhodes et al. | 427/35 |
| 4,400,408 | 8/1983 | Asano et al. | 427/35 |
| 4,526,624 | 7/1985 | Tombrello et al. | 427/38 |

*Primary Examiner*—Nicholas P. Godici
*Assistant Examiner*—Samuel M. Heinrich
*Attorney, Agent, or Firm*—Oblon, Fisher, Spivak, McClelland & Maier

[57] ABSTRACT

Fast union of a ceramic article to an opposed material is attained by a method which comprises forming a film of metal on the surface of the ceramic article, irradiating the surface of the metallic film with high-energy ions to bind the metallic film fast to the ceramic article, and supplying solder or brazing alloy to the surface of the metallic film and soldering or brazing the ceramic article to the opposed article. The high-energy ions for the irradiation has a magnitude of 30 to 800 keV and the dosage of the high-energy ions is in the range of $5 \times 10^{15}$ to $2 \times 10^{18}$ ions/cm$^2$.

13 Claims, No Drawings

METHOD OF BONDING CERAMIC ARTICLE

BACKGROUND OF THE INVENTION

1. Field of the Invention

This invention relates to a method of bonding a ceramic article to a counterpart by forming on the surface of the ceramic article a metal film adhering fast to the surface and soldering or brazing the ceramic article and the counterpart through the medium of the metal film.

2. Description of the Prior Art

Research has been continued in the search for a method of bonding two ceramic articles together or a ceramic article to a metallic member. None of the methods so far developed is capable of effecting the desired bonding with satisfactory strength.

One of the methods so far introduced, for instance, binds a sintered article of SiC or $Si_3N_4$ to a counterpart by forming a film of aluminum by physical vapor deposition on the surface of the sintered article and bonding the sintered article to the counterpart as by soldering through the medium of the aforementioned film. This method has the advantage that the two members can be easily bonded fast to each other because aluminum reacts readily with $Si_3N_4$ or SiC.

With any method which relies upon the physical vapor deposition, however, the fastness or strength of the bond obtained has its limits. Particularly, where a film of metal other than aluminum is used, the bonding cannot be obtained with sufficient fastness.

A satisfactory method of bonding a film of metal fast to the surface of a ceramic article which can be effectively applied to a non-oxide type ceramic article and an oxide type ceramic article has not yet been found.

The applicant for patent formerly filed a parent application [U.S. Appln. Ser. No. 694,759 filed on Jan. 25, 1985] covering an invention which relates to a method for improving the fracture strength of a ceramic article by forming a film of metal on the surface of the ceramic article and irradiating the metallic film downwardly with ions of N or Ar, for example.

SUMMARY OF THE INVENTION

This invention originated in the technical idea underlying the invention of the patent application mentioned above and has matured into the present form because of the subsequent acquisition of knowledge that fast adhesion of a metallic film to a ceramic article is accomplished by the irradiation of the metallic film deposited on the ceramic article with ions described above.

The inventors have made a diligent study on the assumption that when a counterpart is bonded to a metallic film adhering to a ceramic article by means of the irradiation with ions, very strong bonding ought to occur between the ceramic article and the counterpart. They have consequently perfected the present invention which overcomes the aforementioned problems in the conventional method.

An object of the present invention is to provide a method for bonding a ceramic article to another ceramic surface or a metallic surface.

According to this invention, there is provided a method of bonding ceramic articles which comprises forming a metallic film on the surface of the ceramic article, irradiating the surface of said metallic film with high-energy ions to allow the metallic film to adhere fast to said ceramic article, and supplying brazing alloy to the surface of the metallic film and brazing the ceramic article to a counterpart.

The characteristic features of the present invention will become more apparent from the description given in detail herein below.

DETAILED DESCRIPTION

This invention is directed to a method of bonding a ceramic article, comprising a film-forming step for forming a film of metal on the surface of the ceramic article, an irradiation step for irradiating the surface of the metallic film with high-energy ions thereby bonding the metallic film fast to the ceramic article, and a brazing step for supplying solder or brazing alloy to the surface of the metallic film and soldering or brazing the ceramic article to a counterpart.

This invention is applicable to conventionally known ceramics. typically oxide ceramics such as aluminum oxide ($Al_2O_3$) and zirconium oxide ($ZrO_2$) and non-oxide ceramics such as silicon nitride ($Si_3N_4$) and silicon carbide (SiC). These ceramics may be in the form of single crystal or polycrystal. In the case of using ceramics obtained by sintering powdered ceramics, sintering assistants such as yttrium oxide ($Y_2O_3$) and other additives may be incorporated therein.

Production of sintered ceramics can be carried out by means of atmospheric pressure sintering or hot pressing.

The method of this invention starts with a film-forming step for forming a metallic film on the surface of a ceramic article. The aforementioned formation of the metallic film may be limited to the portion of the surface of the ceramic article intended for contact with a counterpart. Optionally, the metallic film so applied may extend well beyond the portion actually required for contact with the counterpart.

The metal selected as the material for the aforementioned metallic film should be capable of being brazed. If the selected metal happens to be incapable of being brazed, some other metal capable of being brazed may be superposed as by vapor deposition on the metallic film already formed on the surface of the ceramic article. The formation of the superposed layer of such other metal may follow the irradiation with ions.

Concrete examples of the metal include titanium (Ti), zirconium (Zr), niobium (Nb), nickel (Ni), Cobalt (Co), iron (Fe), copper (Cu), silver (Ag), gold (Au), hafnium (Hf) and aluminum (Al).

The formation of the metallic film on the surface of the ceramic article can be effected by any of various methods of physical vapor deposition such as thermal vapor deposition, sputtering and ionic plating, chemical vapor deposition and, when the metal happens to be nickel or some other similar substance, by a non-electrolytic plating method.

The surface of the ceramic article, prior to the formation of the metallic film, should be polished by abrasion to a surface roughness of not more than 0.2 s, i.e., a maximum peak-to-valley height of 0.2 $\mu$m. The abraded surface should be washed with an organic solvent such as acetone in order to prepare a clean surface. The thickness of the metallic film to be formed should be within in the range of 0.05 to 1 $\mu$m, though it is variable with the energy of ions used for irradiation in the next step. If the thickness of the metallic film is small, it is difficult to form the metallic film with uniformity. If the thickness is large, the formation of the film calls for a great deal of time and the energy of ions for the irradiation must be increased excessively.

In most cases, the metallic film which is formed on the surface of the ceramic articles is not bonded fast to the ceramic article, so it may be peel from the surface simply by being scratched. It, therefore, demands careful handling.

Then, the method proceeds to an irradiation step for irradiating the ceramic article through the aforementioned metallic film with high-energy ions. The ions so used for the irradiation need only be capable of being easily accelerated in an electric field. Those ions which are in a gaseous state at ambient temperature render the work of irradiation easy. Concrete examples of the ion species which may be used include nitrogen (N), helium (He), neon (Ne), argon (Ar), and xenon (Xe), etc. The ions to be used for the irradiation are not limited to those which are in a gaseous state at ambient temperature. Ions of such a metal as nickel may be used.

The substance selected as an ion source is transformed by heating under a vacuum into a plasma and the plasma is released into an electric field to be accelerated to a prescribed level of energy. The magnitude of the energy given to the ion particles is preferably such that the distance of ion penetration into the metal film is equal to or slightly greater than (i.e. 1 to 1.1 times) the thickness of the metallic film formed on the surface of the ceramic article. The distance of ion penetration is defined by the average distance over which the high-energy ions enter the metallic film and continue to proceed therethrough even with repeated collisions with metal atoms until they lose their energy.

The acceleration of the ions can be carried out by any well-known accelerator such as the Cockcroft-Walton accelerator and the Van de Graaff accelerator.

The acceleration energy should be within the range of 30 to 800 keV, preferably 30 to 400 keV. If the acceleration energy is less than 30 keV, it is necessary to decrease the thickness of the metallic film. Then, the metallic film cannot be easily formed with uniformity. If the acceleration energy exceeds 400 keV, the acceleration itself requires use of an accelerator of large scale which is expensive. If the acceleration energy exceeds 800 keV, the thickness of the metallic film needs to be increased further and the excess energy brings about no additional effect.

The dosage of ions is desired to fall in the range of $5 \times 10^{13}$ to $2 \times 10^{18}$ ions/cm$^2$. Any excess of the dosage brings about no additional effect. If the dosage falls short of the lower limit of the range described above, the irradiation with ions is not as effective as it should be.

When the ions used for the irradiation are those of argon, the adhesion of the metallic film to the ceramic article is obtained with ample fastness by the dosage of about $5 \times 10^{15}$ ions/cm$^2$. When the ions are those of an element of small mass such as helium, the dosage is preferably above $1 \times 10^{17}$ ions/cm$^2$. If the dosage exceeds $2 \times 10^{18}$ ions/cm$^2$, however, the fastness of the adhesion of the metallic film begins to decline. In the manner described above, the metallic film can be applied fast on the surface of the ceramic article. The mechanism of the fast adhesion has not been clarified. The fast adhesion, however, may be logically explained by the supposition that the irradiation with ions causes the so-called atomic mixture near the boundary between the metallic film and the ceramic article.

Then, a brazing step is carried out for bonding the ceramic article to a counterpart through the medium of the metallic film applied fast on the surface of the ceramic article.

When the metallic film is formed of Ni, Co, Cu, Fe, Ag, Au, Ti or Al, the brazing alloy applied on the metallic film and the counterpart are placed on the brazing alloy are heated to a temperature of at least above the melting point of the brazing alloy. After the brazing alloy is fused, the composite is cooled and, through the medium of the metallic film, the ceramic article and the counterpart are brazed to each other. The counterpart is possessed of a joining surface formed of the same metal as that of the metallic film or its alloy, which is capable of being bonded with the brazing alloy. Thus, the counterpart may be formed solely of a metal or in the form of a composite like a ceramic article having a metallic film formed thereon. Optionally, during the course of the brazing, flux may be supplied together with the brazing alloy to the site of brazing. When the metallic film, especially made of Ti, Fe or Al, is irradiated with rather excessive ions, the brazing may prove difficult. The difficulty may be overcome by using a sputtering device, for example, so as to keep the surface of the metallic film clean by reverse sputtering. Otherwise, the surface of the metallic film may be abraded by buffing with fine particles of Al$_2$O$_3$.

When the metallic film is formed of a metal such as Ti, Zr, Nb and Hf which is not readily brazed, a metal such as Fe, Cu and Ni, which is capable of being easily brazed may be superposed by physical vapor deposition or plating in a thickness of at least about 0.1 μm on the metallic film after the metallic film has been treated by etching, that is, reverse sputtering or polishing subsequently to the irradiation with ions. In consideration of the time required for the superposition, the upper limit of the thickness of the superposed metal is desired to be about 5 μm. As the brazing alloy for this treatment, silver solder which enjoys popular use can be adopted where the material for the metallic film is Fe, Ni, Cu, or Co, for example.

By the method described above, fast bonding can be formed between the ceramic article and the opposed material.

In accordance with the present invention, since the adhesion of the metallic film to the surface of the ceramic article can be obtained with great fastness, the ceramic article can be bonded strongly to the counterpart by brazing, for example, through the medium of the metallic film. film.

Further, since the fast adhesion of the metallic film can be obtained for ceramics of both the oxide type and the non-oxide type, this invention is not limited to only certain types of ceramics.

Generally, in the bonding of a ceramic article with a metallic article, it is possible that the bonded area between the two articles may become disrupted or broken, because of the difference in the thermal expansion coefficients of the ceramic and the metal. In accordance with this invention, however, since one is able to select between a wide variety of ceramics and metals, ceramic and metal may be chosen on the basis of no large difference in the respective thermal expansion coefficients of the materials, the joining is allowed to form bonded portions which withstand a harsh environment susceptible of heavy temperature variation.

EXAMPLE 1

A multiplicity of sintered pieces of silicon nitride measuring $5 \times 7 \times 25$ mm were prepared and polished on one side to surface roughness of not more than 0.2 s. By subjecting the polished surfaces to ultrasonic cleaning with acetone, the pieces were finished as ceramic samples according with this invention.

On the samples, Ni, Co, Fe, and Cu were vapor deposited to form metallic films with an electron beam vapor deposition device. The thickness of the metallic films was about 0.3 μm. Then, in a Cockcroft-Walton accelerator, the metallic films were irradiated with accelerated N ions. The dosage of the irradiation was fixed at $2\times10^{17}$ ions/cm$^2$ for all the metallic films.

The voltage for the ionic acceleration was selected so that the range of N ions approximated 0.3 μm. After the irradiation with ions, the surface of the metallic films were abraded by buffing with powdered alumina. With silver solder supplied to the surfaces of the metallic films, counterpart were allowed to adhere fast to the surfaces. The samples and the counterpart so joined were secured with a jig.

The counterpart were Ni-plated pieces of cast iron dimensionally identical with the aforementioned sintered pieces of silicon nitride.

Subsequently, the ceramic samples as bonded to the counterpart were placed in an oven filled with nitrogen gas and then heated at 800° C. for 15 minutes to effect brazing and give rise to composites of ceramics and metal.

The bonded portions of the composites were tested for strength with a tester designed to subject bonded surfaces to vertical separation (cross tensile test) to determine bonded surface stress on rupture. For comparison, composites were prepared by following the foregoing procedure, except for omission of the step of irradiation with N ions. These comparative samples were subjected to the same test. The results of the test are shown in Table 1.

TABLE 1

| Metallic film | Ni | | Co | | Fe | | Cu | |
|---|---|---|---|---|---|---|---|---|
| Use of ionic irradiation | Yes | No | Yes | No | Yes | No | Yes | No |
| Strength of bonded portion (kg/mm$^2$) | 9.0 | 0.1 | 8.0 | 0.2 | 7.5 | 0.1 | 6.5 | 0.1 |

It is noted from the data that use of the ionic irradiation enables the metallic films of Ni, Co, Fe, and Cu invariably to be bound with great fastness to ceramics, so that the ceramics can be fast combined with the counterpart.

EXAMPLE 2

By following the procedure of Example 1, Nb and Zr were vapor deposited in a thickness of 0.3 μm on sintered pieces of silicon nitride as samples. The surfaces of the metallic films so formed were irradiated with N ions at a dosage of $2\times10^{17}$ ions/cm$^2$. The voltage for acceleration of ions was fixed at 270 kV for Nb and 200 kV for Zr respectively so that the range of ions within the metallic films approximated 0.3 μm.

After the irradiation with N ions, the samples were removed from the ionic irradiation tank, and set up in a sputtering device. In this device, the surfaces of the samples which had undergone the ionic irradiation was subjected to reverse sputtering with Ar ions for about 10 minutes. On the cleaned surfaces, Fe was vapor deposited by sputtering. The thickness of the Fe films so formed was about 0.3 μm.

After the vapor deposition of Fe, the samples were brazed by following the procedure of Example 1. For comparison, composites were prepared by faithfully following the procedure of Example 1, except for omission of the step for irradiation with N ions. After the brazing, the bonded surfaces of the samples were tested for strength. The samples which were not irradiated with N ions were similarly tested. The results of the test are shown in Table 2. It is noted from the data that use of the ionic irradiation enables the metallic films to be bonded to ceramics with added fastness so that the ceramics can be fast combined with the counterpart.

TABLE 2

| Metallic film | Nb | | Zr | |
|---|---|---|---|---|
| Use of ionic irradiation | Yes | No | Yes | No |
| Strength of bonded portion (kg/mm$^2$) | 10.2 | 0.1 | 12.3 | 0.2 |

EXAMPLE 3

On the same sintered samples of silicon nitride as used in Example 1, Ti was vapor deposited in a thickness of about 0.3 μm. The metallic films thus formed were irradiated with N ions accelerated with a voltage of 150 kV. The dosage of the ionic irradiation was varied in the range of $5\times10^{15}$ to $1\times10^{18}$ ions/cm$^2$ as indicated in Table 3. After the ionic irradiation, the samples were subjected to vapor deposition of Fe and then to brazing in the same procedure of Example 2. The composites so produced were subjected to a separation test to determine their strength of union. The results are shown in Table 3. It is noted from the data that the effect of the ionic irradiation is not obtained when the dosage is below $5\times10^{15}$ ions/cm$^2$.

TABLE 3

| Dosage of irradiation with N ions (1/cm$^2$) | 0 | $5\times10^{15}$ | $1\times10^{16}$ | $5\times10^{16}$ | $1\times10^{17}$ | $2\times10^{17}$ | $5\times10^{17}$ | $1\times10^{18}$ |
|---|---|---|---|---|---|---|---|---|
| Strength of bound portion (kg/mm$^2$) | 0.2 | 0.5 | 5.0 | 10.0 | 12.2 | 14.1 | 13.8 | 2.1 |

It is further noted from the data that the strength of union notably increases when the dosage rises above $1\times10^{16}$ ions/cm$^2$ but that the strength of union begins to decline as the dosage rises past $1\times10^{18}$ ions/cm$^2$.

EXAMPLE 4

Sample pieces of silicon carbide, alumina, and zirconia measuring $5\times7\times25$ mm were prepared and subjected to surface treatment by the same method as used in Example 1. On the samples, Ti was vapor deposited in a thickness of 0.3 μm to form metallic films. The metallic films were irradiated with N ions accelerated at 150 kV at a dosage of $2\times10^{17}$ ions/cm$^2$.

Then, the samples were subjected to vapor deposition of Fe by sputtering and then to brazing by following the procedure of Example 3. For comparison, samples were prepared by following the procedure of Example 3, except for omission of the step for irradiation with N ions.

The samples were tested for strength of bonded portions. The results are shown in Table 4.

TABLE 4

| Ceramics | Silicon carbide | | Alumina | | Zirconia | |
| --- | --- | --- | --- | --- | --- | --- |
| Use of ionic irradiation | Yes | No | Yes | No | Yes | No |
| Strength of bonded portion (kg/mm$^2$) | 12.3 | 0.1 | 10.6 | 0.1 | 8.6 | 0.1 |

It is noted from the data that fast union is invariably obtained for all the ceramics tried.

EXAMPLE 5

By following the procedure of Example 3, Ti was vapor deposited on sintered samples of silicon nitride. The metallic films so deposited on the samples were irradiated with various high-energy ion, i.e. He ions, Ne ions, and Ar ions, at a fixed dosage of $2 \times 10^{17}$ ions/cm$^2$. The voltage for ionic acceleration was 50 kV for He ions, 200 kV for Ne ions, and 400 kV for Ar ions respectively.

After the ionic irradiation, Ni was vapor deposited by sputtering on the samples. The samples of same material were brazed to each other in a crossed state with silver solder. The brazed samples were subjected to a separation test to determine strength of bonded portion. The results are shown in Table 5.

TABLE 5

| Kind of ion | He | Ne | Ar |
| --- | --- | --- | --- |
| Strength of bonded portion (kg/mm$^2$) | 3.4 | 12.4 | 13.8 |

It is noted from the data that the ionic irradiation is effective in enhancing the strength of bonded portion without reference to the kind of ion used.

In the separation test performed in each of the working examples cited above, rupture invariably occurred between a ceramic article and a metallic film.

What is claimed is:

1. A method of bonding a ceramic article to the surface of a counterpart with high strength, which comprises:
    forming a metallic film from at least one metal selected from the group consisting of Co, Ni, Cu, Ag, Au, Ti, Fe and Al on the surface of said ceramic article which is formed from a ceramic material selected from the group consisting of Al$_2$O$_3$, ZrO$_2$, Si$_3$N$_4$ and SiC;
    irradiating the surface of said metallic film with high-energy ions at a dosage ranging from $5 \times 10^{16}$ to $5 \times 10^{17}$ ions/cm$^2$ to promote the adhesion of said metallic film to said ceramic article; and
    supplying brazing alloy to the surface of said metallic film and brazing said ceramic article to the surface of said counterpart.

2. The method according to claim 1, wherein the bonding strength of said metal film to said ceramic article ranges from 10.0 to 14.1 kg/mm$^2$.

3. The method according to claim 1, wherein said ions are selected from the group consisting of He, Ar, Ne, Xe and N ions.

4. The method according to claim 1, wherein said metallic film has a thickness of 0.05 to 1 μm.

5. The method according to claim 1, wherein said irradiating is carried out in a manner that the distance of ion penetration into said metallic film is 1 to 1.1 times the thickness of said metallic film.

6. The method according to claim 5, wherein said brazing alloy is selected from the group consisting of silver solder and solder.

7. The method according to claim 1, wherein said metallic film is formed by one of physical vapor deposition and chemical vapor deposition.

8. The method according to claim 1, further comprising, after the step of said irradiating, subjecting the surface of said metallic film to etching.

9. The method according to claim 8, wherein, after the step of said etching, another metallic film of a metal capable of being brazed is formed on said metallic film subjected to said etching, said metallic film being selected from the group consisting of Ti, Zr, Hf and Nb, and said another metallic film being selected from the group consisting of Fe, Cu and Ni.

10. The method according to claim 9, wherein said metallic film has a thickness of 0.05 to 1 μm.

11. The method according to claim 10, wherein said ions are selected from the group consisting of He, Ar, Ne, Xe and N ions.

12. The method according to claim 11, wherein said irradiating is carried out in a manner that the distance of ion penetration into said metallic film is 1 to 1.1 times the thickness of said metallic film.

13. The method according to claim 12, wherein said brazing alloy is selected from the group consisting of silver solder and solder.

* * * * *